United States Patent
Li et al.

(10) Patent No.: US 11,295,284 B2
(45) Date of Patent: Apr. 5, 2022

(54) METHOD, DEVICE, STORAGE MEDIUM, AND SYSTEM FOR SHARING A NAIL PRINTING PATTERN

(71) Applicant: SHENZHEN DANYA TECHNOLOGY CO., LTD., Shenzhen (CN)

(72) Inventors: Ran Li, Shenzhen (CN); Zhenqing Lin, Shenzhen (CN); Peng He, Shenzhen (CN)

(73) Assignee: SHENZHEN DANYA TECHNOLOGY CO., LTD., Shenzhen (CN)

( * ) Notice: Subject to any disclaimer, the term of this patent is extended or adjusted under 35 U.S.C. 154(b) by 303 days.

(21) Appl. No.: 16/460,988

(22) Filed: Jul. 2, 2019

(65) Prior Publication Data

US 2020/0193399 A1 Jun. 18, 2020

(30) Foreign Application Priority Data

Dec. 14, 2018 (CN) .......................... 201811536944.5

(51) Int. Cl.
*G06Q 30/00* (2012.01)
*G06Q 20/12* (2012.01)
*A45D 29/00* (2006.01)
*G06Q 30/02* (2012.01)

(52) U.S. Cl.
CPC .......... *G06Q 20/123* (2013.01); *A45D 29/00* (2013.01); *G06Q 30/0206* (2013.01); *A45D 2029/005* (2013.01)

(58) Field of Classification Search
CPC .. G06Q 20/123; G06Q 30/0206; A45D 29/00; A45D 2029/005
See application file for complete search history.

(56) References Cited

U.S. PATENT DOCUMENTS

| 9,687,059 | B2 | 6/2017 | Walia et al. |
| 10,846,808 | B1 * | 11/2020 | Posillico .............. G06Q 20/065 |
| 2002/0033959 | A1 | 3/2002 | Ando et al. |

(Continued)

FOREIGN PATENT DOCUMENTS

| CN | 101067830 A | 11/2007 |
| CN | 204580251 U | 8/2015 |

(Continued)

OTHER PUBLICATIONS

Kim, Namsoo Peter, Jihye Kim, and Myung Sook Han. "The convergence of three-dimensional printing and nail-art technology." Journal of Cosmetic Medicine 3.2 (2019): 94-101.*

(Continued)

*Primary Examiner* — Kathleen Palavecino
(74) *Attorney, Agent, or Firm* — Metis IP LLC

(57) ABSTRACT

The present disclosure relates to a method, device, storage medium, and system for sharing a nail printing pattern. The method may include receiving the nail printing pattern and price information of the nail printing pattern uploaded by a first account via a first user terminal or a first nail printing device; verifying the nail printing pattern and the price information of the nail printing pattern based on a preset rule; and if the nail printing pattern qualifies for the preset rule, storing qualified nail printing pattern to a server.

11 Claims, 9 Drawing Sheets

(56) References Cited

U.S. PATENT DOCUMENTS

| | | |
|---|---|---|
| 2013/0038647 A1 | 2/2013 | Hashimoto |
| 2016/0052295 A1* | 2/2016 | Legallais ............... G06F 3/1285 |
| | | 358/1.8 |
| 2017/0366917 A1 | 12/2017 | Chen et al. |
| 2018/0237230 A1* | 8/2018 | Grazioli ............... B65G 47/847 |
| 2018/0263356 A1 | 9/2018 | Cao |
| 2019/0239616 A1* | 8/2019 | Walia ..................... A45D 29/14 |
| 2020/0013073 A1* | 1/2020 | Bakalis .............. G06K 7/10722 |

FOREIGN PATENT DOCUMENTS

| | | |
|---|---|---|
| CN | 107296364 A | 10/2017 |
| CN | 107545542 A | 1/2018 |
| CN | 107846451 A | 3/2018 |
| CN | 108198042 A | 6/2018 |
| CN | 108900571 A | 11/2018 |
| CN | 108973354 A | 12/2018 |

OTHER PUBLICATIONS

First Office Action in Chinese Application No. 201811536944.5 dated Dec. 25, 2020, 18 pages.
The Second Office Action in Chinese Application No. 201811536944.5 dated Jul. 9, 2021, 17 pages.

\* cited by examiner

METHOD, DEVICE, STORAGE MEDIUM, AND SYSTEM FOR SHARING A NAIL PRINTING PATTERN

CROSS-REFERENCE TO RELATED APPLICATIONS

This application claims priority of Chinese Application No. 201811536944.5, filed on Dec. 14, 2018, the contents of which are hereby incorporated by reference in its entirety.

TECHNICAL FIELD

The present disclosure relates to the field of communication technology, especially relates to a method, device, storage medium, and system for sharing a nail printing pattern.

BACKGROUND

Nail printing is an art of improving the beauty of nails or fingers, also known as a nail art. Nail printing is a process of disinfecting, cleaning, nursing, maintaining, decorating and beautifying nails according to customers' requirements.

The current nail printing mainly is done by painting nails manually, which may be inefficient for some delicate patterns. With the development of technology, nail printing devices are becoming available. The nail printing devices can print patterns automatically. However, the types of patterns stored in the nail printing devices are limited, which are not able to meet the various individual needs. Therefore, it is desirable to provide methods and devices for sharing nail printing patterns to satisfy diverse requirements thereof.

SUMMARY

The present disclosure relates to a method, device, storage medium, and system for sharing nail printing patterns, which may implement the sharing printing of the patterns and satisfy diverse requirements thereof.

In a first aspect of the present disclosure, a method for sharing a nail printing pattern is provided. The method may be implemented on a computing device having at least one processor, at least one storage medium, and a communication platform connected to a network. The method may include receiving a nail printing pattern and price information of the nail printing pattern uploaded by a first account via a first user terminal or a first nail printing device; verifying the nail printing pattern and the price information of the nail printing pattern based on a preset rule; and if the nail printing pattern qualifies for the preset rule, storing qualified nail printing pattern to a server.

In a second aspect of the present disclosure, a device for sharing a nail printing pattern is provided. The device may include an image receiving module, an image verification module, and an image sending module. The image receiving module may be configured to receive the nail printing pattern and price information of the nail printing pattern uploaded by a first account via a user terminal or a nail printing device. The image verification module may be configured to verifying the nail printing pattern and the price information of the nail printing pattern based on a preset rule. The image sending module may be configured to store qualified nail printing pattern to a server if the nail printing pattern qualifies for the preset rule.

In a third aspect of the present disclosure, a computer-readable storage medium is provided. The computer-readable storage medium may store computer programs. The computer programs may be executed by a processor to implement the above method for sharing a nail printing pattern.

In a fourth aspect of the present disclosure, a system for sharing a nail printing pattern is provided. The system may include a storage, a processor, and computer programs stored in the storage. When executing the computer programs, the processor may be configured to implement the above method for sharing a nail printing pattern.

Compared with the prior art, the method disclosed in the present disclosure may include receiving a nail printing pattern and price information of the nail printing pattern uploaded by a first account via a first user terminal or a first nail printing device; verifying the nail printing pattern and the price information of the nail printing pattern based on a preset rule; and if the nail printing pattern qualifies for the preset rule, storing qualified nail printing pattern to a server. The method can conveniently manage and store nail printing patterns that are liked by users or customized, and facilitate the users to use the nail printing patterns for free or paid, and to share printing of the patterns, thereby satisfying the diverse requirements for nail printing patterns.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
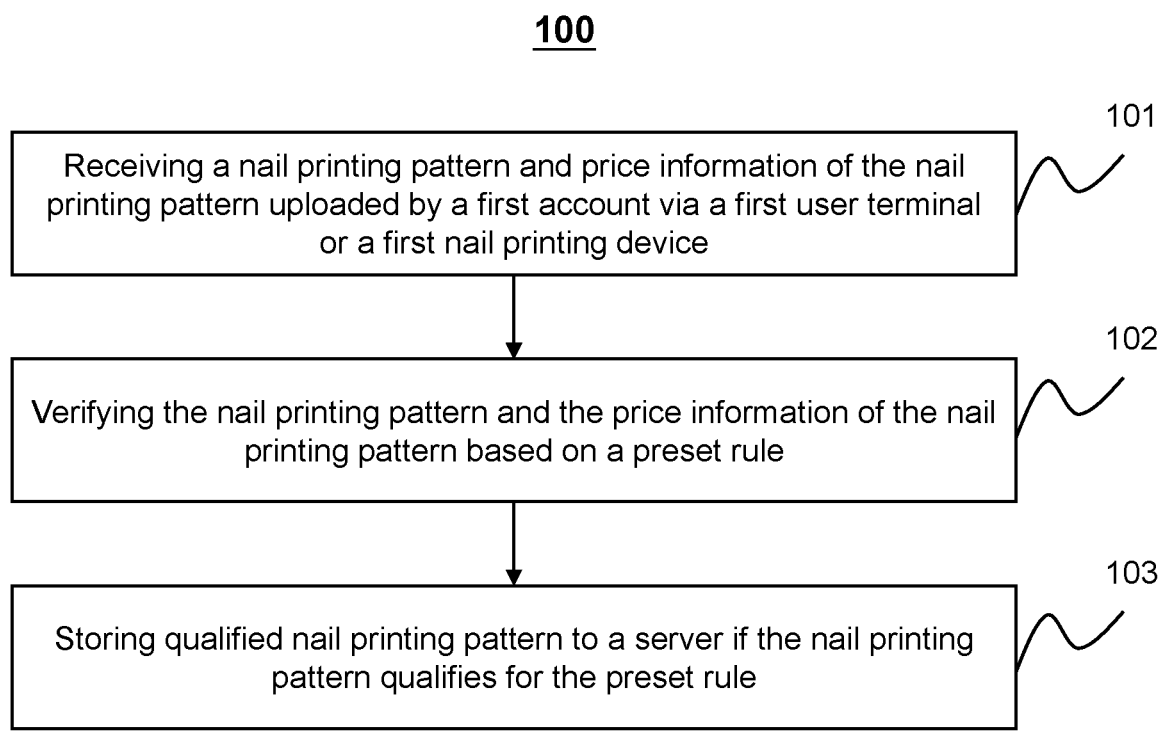
FIG. 1 is a flowchart illustrating an exemplary process for sharing nail printing patterns according to a first embodiment of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "engine," "unit," "module," and/or "block" used herein are one method to distinguish different components, elements, parts, section or assembly of different level in ascending order. However, the terms may be displaced by another expression if they achieve the same purpose.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or other storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in a firmware, such as an erasable programmable read-only memory (EPROM). It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments in the present disclosure. It is to be expressly understood, the operations of the flowchart may be implemented not in order. Conversely, the operations may be implemented in inverted order, or simultaneously. Moreover, one or more other operations may be added to the flowcharts. One or more operations may be removed from the flowcharts.

Embodiment One

Figure 8:
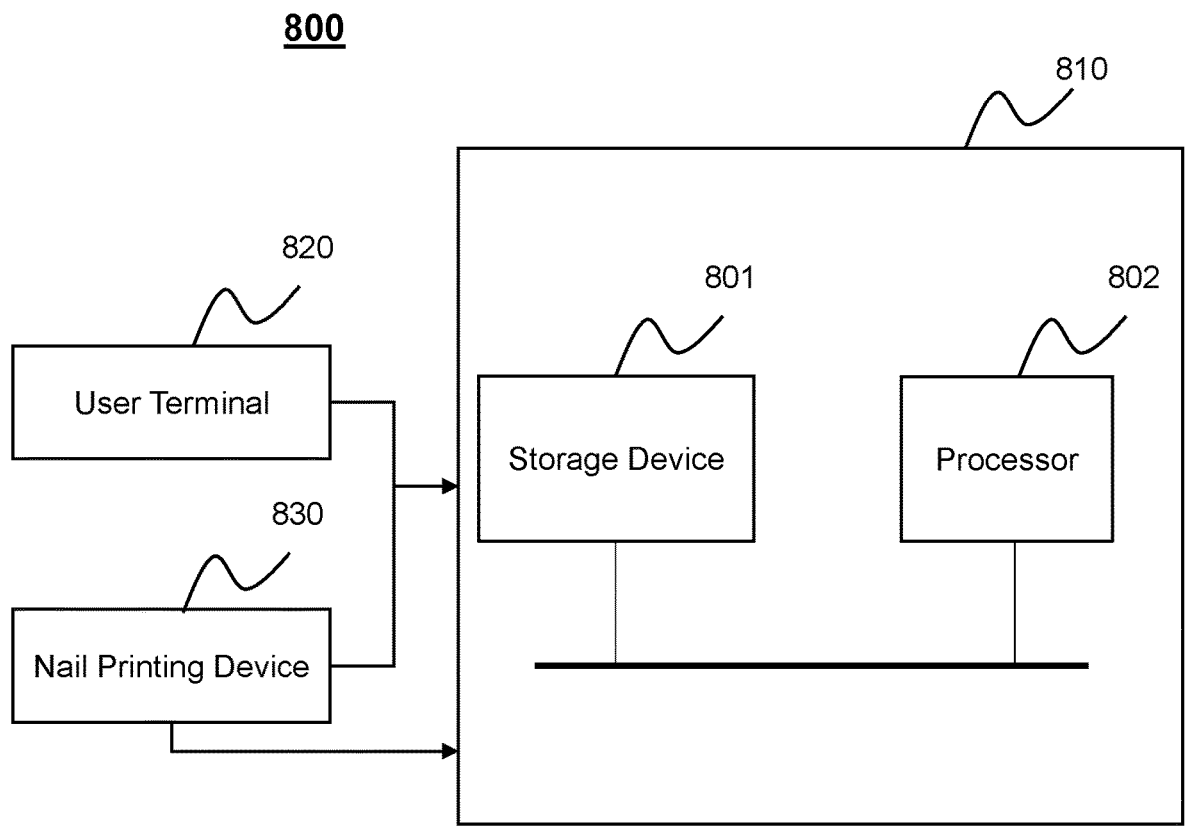
FIG. 8 is a schematic diagram illustrating an exemplary system for sharing nail printing patterns according to an eighth embodiment of the present disclosure.

FIG. 1 is a flowchart illustrating an exemplary process for sharing nail printing patterns according to a first embodiment of the present disclosure. The process 100 disclosed in the present embodiment may be implemented on a mobile device that can perform functions of nail printing pattern sharing. In some embodiments, the mobile device may include a mobile phone, a tablet, a laptop computer, a desktop, a server, or the like, or any combination thereof. In some embodiments, the process 100 disclosed in the present embodiment may be implemented on the system 800 as illustrated in FIG. 8. For example, one or more operations in the process 100 may be stored in the storage device 801 of the server 810 as a form of instructions, and invoked and/or executed by the processor 802 of the server 810. In some embodiments, the instructions may be transmitted in a form of electronic current or electrical signals. For illustration purposes, the processor 802 may be described as a subject to perform the process 100. In some embodiments, the process 100 may include one or more following operations.

In 101, the processor 802 may receive a nail printing pattern and price information of the nail printing pattern uploaded by a first account (e.g., a user or a designer) via a first user terminal or a first nail printing device.

In 102, the processor 802 may verify the nail printing pattern and the price information of the nail printing pattern based on a preset rule.

In 103, the processor 802 may store qualified nail printing pattern to a server (e.g., server 810) if the nail printing pattern qualifies for the preset rule.

In 101, a user (e.g., a designer) may design a nail printing pattern according to his/her own aesthetic preference, and upload the nail printing pattern to a server (e.g., a cloud server) or a database (e.g., a cloud database) using the first user terminal or the first nail printing device. In some embodiments, the price information of the nail printing pattern may be set by the user according to one or more factors, such as workload required to design the nail printing pattern, image sources of the nail printing pattern, or the like. For example, the price information may refer to a price of using the nail printing pattern once (e.g., 10 yuan/per use, 20 yuan/per use), or a price of the nail printing pattern within a time period (e.g., 100 yuan/every month, 200 yuan/every month). As another example, the price information may be a commission of a selling price, such as 40% or 50% of the selling price. As a further example, the price information may be a price range, e.g., 10-50 yuan/per use, or a commission range of a selling price, e.g., 20%-50% of the selling price. In some embodiments, the first account may be an account registered on an application (e.g., a nail printing mall application) by a user using his/her identity information, or an account registered on the nail printing mall application by his/her friend, which is not limited in the present disclosure. In some embodiments, the nail printing pattern may have a predetermined size. For example, the nail printing pattern may be a whole image or part of the image. The image may include an image of animal(s), landscape(s), object(s), clothing, or the like, or any combination thereof. The user may make the nail printing pattern according to the predetermined size. Then the user may press and/or touch an uploading button or window on the nail printing mall application to upload the nail printing pattern and the price information of the nail printing pattern to a cloud server or a cloud database via the first user terminal or the first nail printing device.

In 102, the preset rule may include verifying whether content of the nail printing pattern satisfies a predetermined security level; verifying whether a format of the nail printing pattern satisfies a predetermined image quality requirement; verifying whether the price information of the nail printing pattern satisfies a predetermined price range, or the like. The verifying whether the content of the nail printing pattern satisfies the predetermined security level may include verifying whether the content of the nail printing pattern complies with laws and regulations, or violates ethics, etc. The verifying whether the format of the nail printing pattern satisfies the predetermined image quality requirement may include verifying the format of the nail printing pattern satisfies the predetermined image quality requirement based on image factors such as resolution, color, size, or the like. In some embodiments, whether the nail printing pattern is the same as an existing nail printing pattern in a cloud database or a cloud server may also be verified. The verifying whether the price information of the nail printing pattern satisfies the predetermined price range may include verifying whether the price information of the nail printing pattern satisfies the predetermined price range or a predetermined commission range of a selling price. For example, if the price information of the nail printing pattern is 10,000 yuan/per use, and the predetermined price range is 0-100 yuan/per use, it may indicate that the price information may not satisfy the preset rule. In some embodiments, the server (e.g., the processor 802 of the server 810) may set a verifying deadline (e.g., 24 hours, three days, a week) for each uploaded nail printing pattern. The server (e.g., the processor 802 of the server 810) may automatically verify the uploaded nail printing pattern(s) based on the preset rule before the verifying deadline.

In 103, the qualified nail printing pattern(s) may be stored to the server (e.g., the cloud server). In some embodiments, the server may store the uploaded nail printing pattern(s) based on a type of the nail printing pattern(s), the price information of the nail printing pattern(s), a type of the first account(s), or the like, or any combination thereof. In some embodiments, the nail printing pattern(s) may be stored in one cloud server or multiple cloud servers, or may be stored in a distributed storage system including multiple computers or servers.

Compared with the prior art, the process 100 disclosed in the embodiment of the present disclosure may include receiving the nail printing pattern and the price information of the nail printing pattern uploaded by the first account via the first user terminal or the first nail printing device; verifying the nail printing pattern and the price information of the nail printing pattern based on a preset rule; and if the nail printing pattern qualifies for the preset rule, storing the qualified nail printing pattern to a server. The process 100 disclosed in the present disclosure may conveniently manage and store nail printing patterns that are liked by users or customized, and facilitate the users to use the nail printing patterns for free or paid, and to share printing of the patterns, thereby satisfying the diverse requirements for nail printing patterns. The nail printing system (e.g., the nail printing mall application) may be more open by accepting the uploaded nail printing pattern(s), which may satisfy needs of different users for customized nail printing patterns, and provide a platform for sharing nail printing patterns created by nail artists.

Embodiment Two

Figure 2:
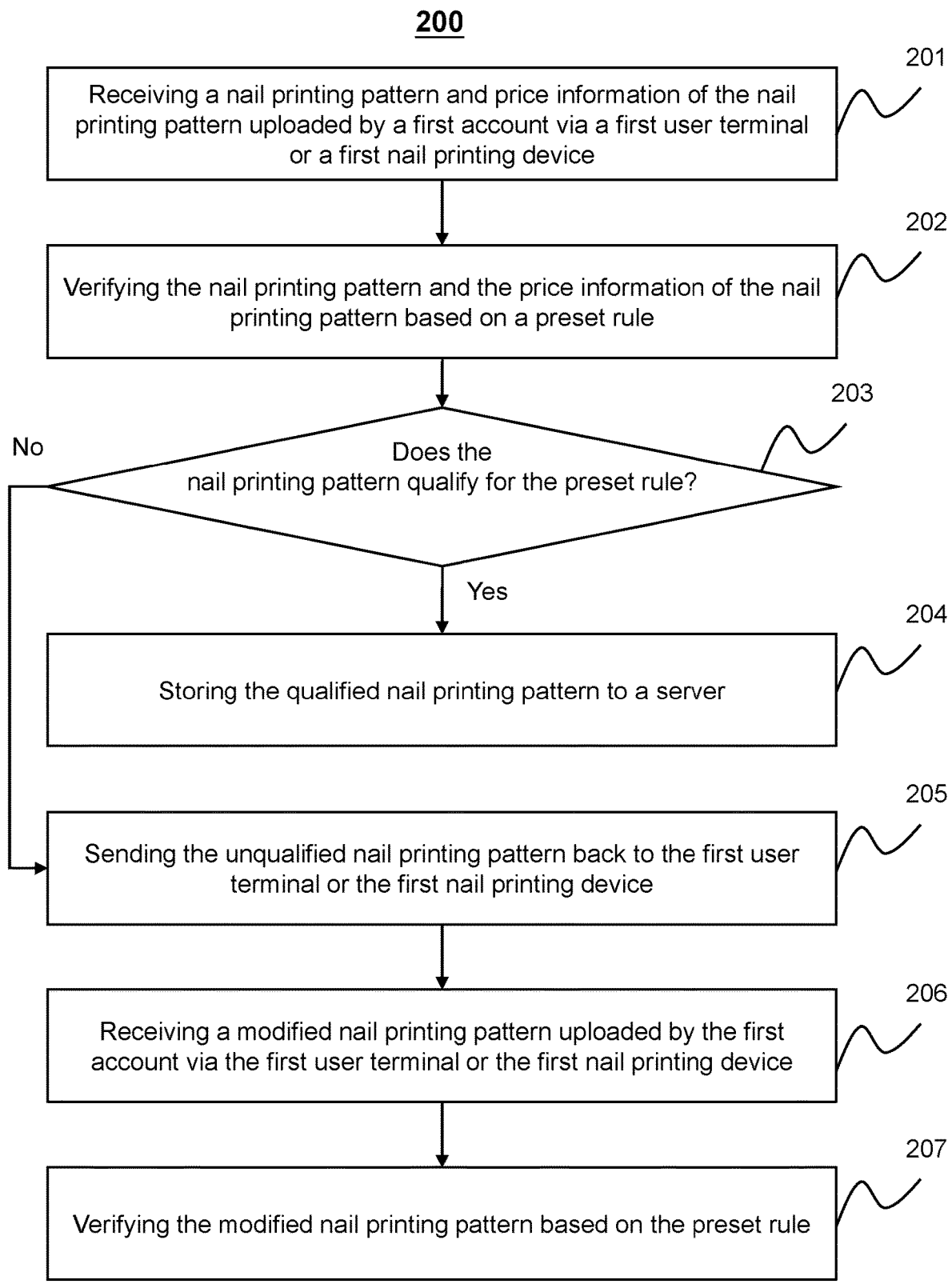
FIG. 2 is a flowchart illustrating an exemplary process for sharing nail printing patterns according to a second embodiment of the present disclosure.

FIG. 2 is a flowchart illustrating an exemplary process for sharing nail printing pattern according to a second embodiment of the present disclosure. The process 200 disclosed in the present embodiment may be implemented on a mobile device that can perform functions of nail printing pattern sharing. In some embodiments, the mobile device may include a mobile phone, a tablet, a laptop computer, a desktop, a server, or the like, or any combination thereof. In some embodiments, the process 200 disclosed in the present embodiment may be implemented on the system 800 as illustrated in FIG. 8. For example, one or more operations in the process 200 may be stored in the storage device 801 of the server 810 as a form of instructions, and invoked and/or executed by the processor 802 of the server 810. In some embodiments, the instructions may be transmitted in a form of electronic current or electrical signals. For illustration purposes, the processor 802 may be described as a subject to perform the process 200. The process may include one or more following operations.

In 201, the processor 802 may receive a nail printing pattern and price information of the nail printing pattern uploaded by a first account (e.g., a user or a designer) via a first user terminal or a first nail printing device.

In 202, the processor 802 may verify the nail printing pattern and the price information of the nail printing pattern based on a preset rule.

In 203, the processor 802 may determine whether the nail printing pattern qualifies for the preset rule. In response to a determination that the nail printing pattern qualifies for the preset rule, the processor 802 may proceed to operation 204. Alternatively, in response to a determination that the nail printing pattern does not qualify for the preset rule, the processor 802 may proceed to operation 205.

In 204, the processor 802 may store the qualified nail printing pattern to a server (e.g., a cloud server).

In 205, the processor 802 may send the unqualified nail printing pattern back to the first user terminal or the first nail printing device.

In 206, the processor 802 may receive a modified nail printing pattern uploaded by the first account via the first user terminal or the first nail printing device.

In 207, the processor 802 may verify the modified nail printing pattern based on the preset rule.

In some embodiments, operations 201-204 may be performed in a similar manner with operation 101-103 of the process 100, and the descriptions thereof are not repeated herein. In operations 205-207, if the nail printing pattern(s) uploaded by the first account (e.g., the user) does not qualify for (or conform to) the preset rule, the server (e.g., the processor 802 of the server 810) may generate an unqualifying notification and send the unqualifying notification to the first user terminal or the first nail printing device via a network (e.g., Internet). The unqualifying notification may be sent to the first user terminal or the first nail printing device via short message, WeChat, E-mail, or the like. In some embodiments, the unqualifying notification may include specific instructions that the nail printing pattern does not qualify for the preset rule. The user may modify the unqualified nail printing pattern based on the specific instructions after receiving the unqualifying notification and re-upload the modified nail printing pattern using the first user terminal or the first nail printing device. The processor 802 may verify the modified nail printing pattern based on the preset rule within a predetermined time slot (e.g., before the verifying deadline as described in connection with FIG. 1). If the modified nail printing pattern qualify for the preset rule, the qualified nail printing pattern may be stored to the server. If the modified nail printing pattern does not qualify for the preset rule, the processor 802 may repeat operations 205-207 until the modified nail printing pattern qualifies for the preset rule. In some embodiments, the processor 802 may set a predetermined frequency threshold for modifying and/or uploading the same nail printing pattern by the same first account (e.g., the same user). When the frequencies of modifying and/or uploading the same nail printing pattern by a first account exceed the predetermined frequency threshold, the processor 802 may restrict the uploading of the first account. For example, the processor 802 may prohibit the first account (e.g., the user) to repeatedly upload the same nail printing pattern and/or the price information of the same nail printing pattern within a time period (e.g., 15 minutes, one day).

Compared with the prior art, the process 200 disclosed in the embodiment of the present disclosure provides an approach for modifying and re-uploading an unqualified nail printing pattern, and provides an approach for preventing the user (or first account) from uploading the same nail printing patterns multiple times within a time threshold. This redundant uploading may take up too many system resources of the nail printing system (e.g., the nail printing mall application), and thus, avoiding it may improve the operation efficiency of the nail printing system (e.g., the nail printing mall application).

Embodiment Three

Figure 3:
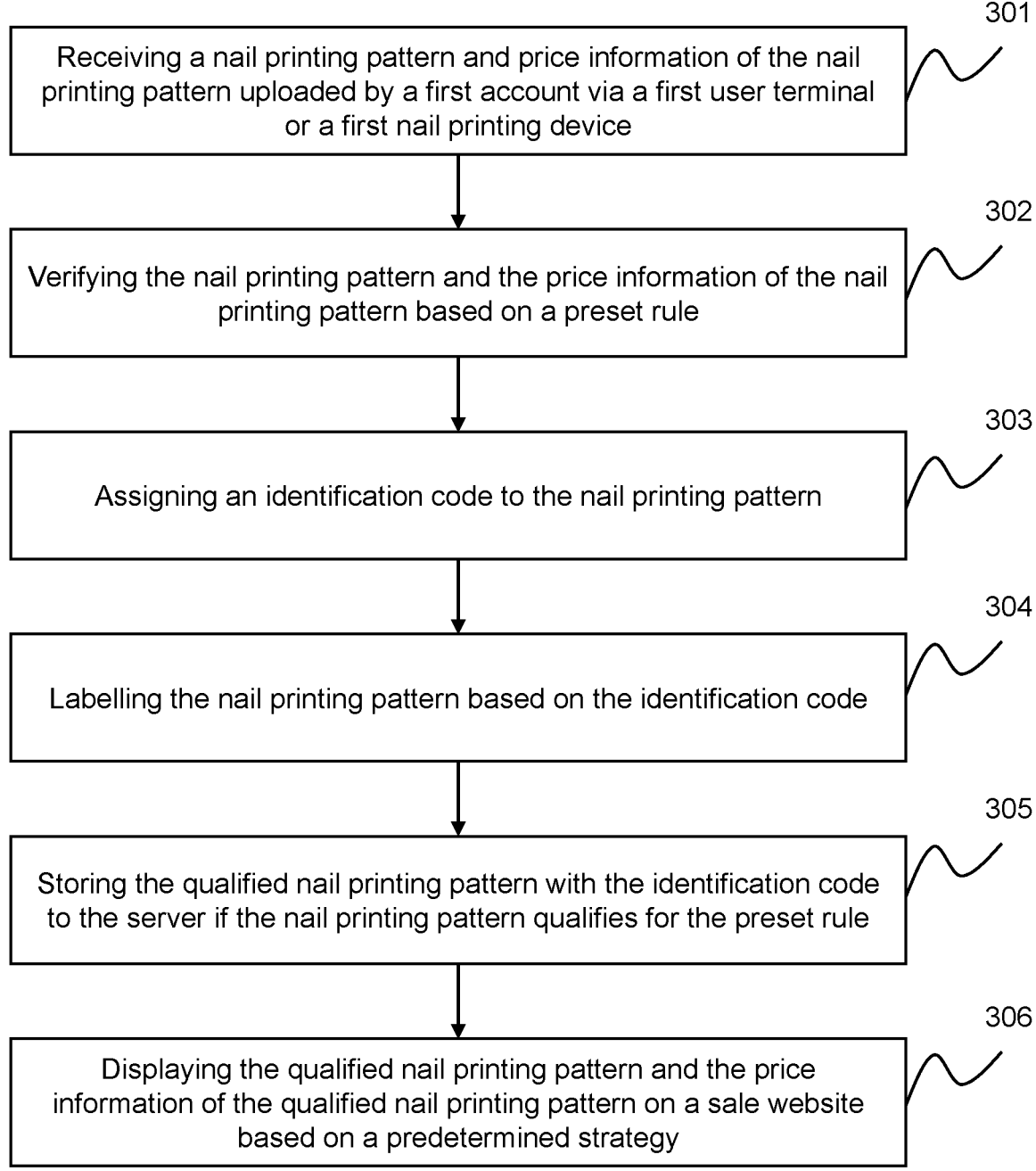
FIG. 3 is a flowchart illustrating an exemplary process for sharing nail printing patterns according to a third embodiment of the present disclosure.

FIG. 3 is a flowchart illustrating an exemplary process for sharing a nail printing pattern according to a third embodiment of the present disclosure. The process 300 disclosed in the present embodiment may be implemented on a mobile device that can perform functions of nail printing pattern sharing. In some embodiments, the mobile device may include a mobile phone, a tablet, a laptop computer, a desktop, a server, or the like, or any combination thereof. In some embodiments, the process 300 disclosed in the present embodiment may be implemented on the system 800 as illustrated in FIG. 8. For example, one or more operations in the process 300 may be stored in the storage device 801 of the server 810 as a form of instructions, and invoked and/or executed by the processor 802 of the server 810. In some embodiments, the instructions may be transmitted in a form of electronic current or electrical signals. For illustration purposes, the processor 802 may be described as a subject to perform the process 300. The method may include one or more following operations.

In 301, the processor 802 may receive a nail printing pattern and price information of the nail printing pattern uploaded by a first account (e.g., a user or a designer) via a first user terminal or a first nail printing device.

In 302, the processor 802 may verify the nail printing pattern and the price information of the nail printing pattern based on a preset rule.

In 303, the processor 802 may assign an identification code to the nail printing pattern.

In 304, the processor 802 may label the nail printing pattern based on the identification code.

In 305, the processor 802 may store the qualified nail printing pattern with the identification code to the server if the nail printing pattern qualifies for the preset rule.

In some embodiments, operations 301 and 302 may be performed in a similar manner with operations 101 and 102 of the process 100, and the descriptions thereof are not repeated here. In operations 303-305, the identification code may be a serial code generated by the server (e.g., the processor 802 of the server 810) according to the sequence of uploading the nail printing patterns, or a time stamp generated according to the time of uploading the nail printing pattern, or a combination thereof. For example, the time of uploading the nail printing pattern may be Dec. 1, 2018 (also indicated as Dec. 1, 2018, and the updated nail printing pattern may be the $2034^{th}$ image. The identification code of the nail printing pattern may be set to 201812012034 or 203420181201. In some embodiments, the identification code of the nail printing pattern may be labelled to a predetermined identification position of the nail printing pattern, for example, an upper left corner or a bottom right corner of the nail printing pattern, or the like. It should be noted that the descriptions of the predetermined identification position are merely for illustration purposes and are not intended to limit the scope of the present disclosure.

In 306, the processor 802 may display the qualified nail printing pattern and the price information of the qualified nail printing pattern on a sale website (e.g., the nail printing mall application) based on a predetermined strategy. A user (e.g., a nail printing pattern requester) may access the sale website via a mobile phone or a computer to select a nail printing pattern for printing, which may be convenient for the user to preview or consume. In some embodiments, the nail printing patterns may be displayed in categories on the sale website. For example, the nail printing patterns may be classified based on types of images, e.g., animals, plants, landscapes, characters, or the like. As another example, the nail printing patterns may be classified based on the time of uploading nail printing patterns, e.g., in the recent week, in the recent month, half year ago, one year ago, or the like. In some embodiments, when the user logins into the sale website using his account (e.g., also referred to as a second account), he/her may receive notification information for newly updated nail printing patterns by other users (e.g., designers), and he/her may preview the newly updated nail printing patterns by directly clicking the notification information. In some embodiments, the processor 802 may record the nail printing pattern(s) that have been used or consumed by the user, and automatically recommend nail printing patterns that are the same as or similar to the nail printing pattern(s) that have been used or consumed by the user, which may help the user to quickly find desired nail printing patterns. In some embodiments, the nail printing patterns browsed by the user may be recorded and ranked based on the browsing time, which is convenient for the user to browse again.

In some embodiments, the process 300 may include an additional step (not shown in FIG. 3). In the additional step, the processor 802 may send a qualifying notification of the nail printing device to the first account of the first user terminal or the first nail printing device, so that the user can timely know the verification schedule and modify the unqualified nail printing pattern. In some embodiments, the qualifying notification may include a thumbnail of the nail printing pattern, the price of the nail printing pattern, a qualification result of the nail printing pattern, or the like, or any combination thereof.

Compared with the prior art, in the embodiment of the present disclosure, each uploaded nail printing pattern may be assigned with a singly unique identification code, which may facilitate the management of the nail printing patterns and help to determine and recommend popular nail printing patterns. Besides, the unique identification code of each nail printing pattern may help sale or the user (e.g., a designer) to know the information of his/her nail printing patterns timely, improving user experience.

Embodiment Four

Figure 4:
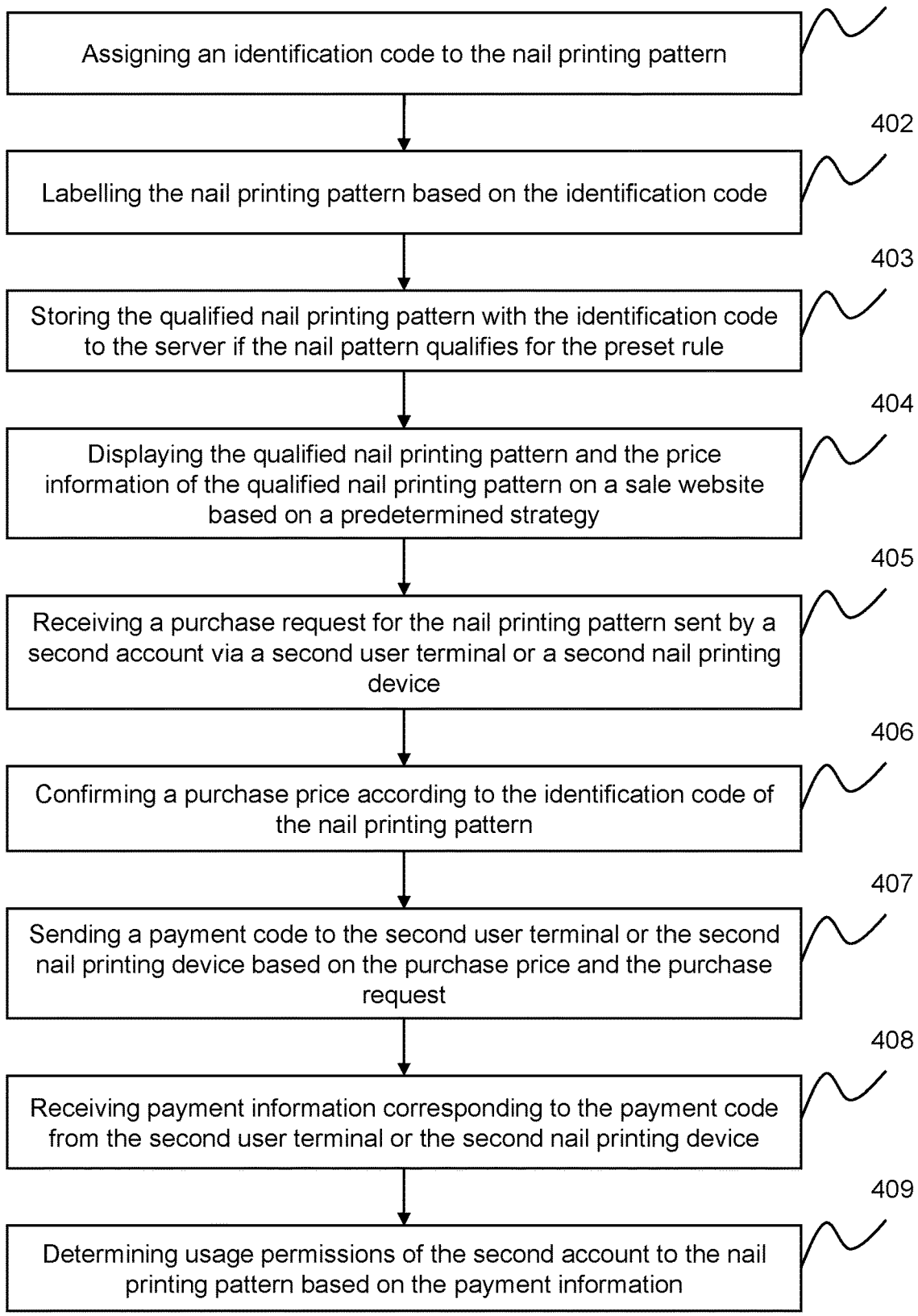
FIG. 4 is a flowchart illustrating an exemplary process for sharing nail printing patterns according to a fourth embodiment of the present disclosure.

FIG. 4 is a flowchart illustrating an exemplary process for sharing nail printing patterns according to a fourth embodiment of the present disclosure. The process 400 disclosed in the present embodiment may be implemented on a mobile device that can perform functions of nail printing pattern sharing. In some embodiments, the mobile device may include a mobile phone, a tablet, a laptop computer, a desktop, a server, or the like, or any combination thereof. In some embodiments, the process 400 disclosed in the present embodiment may be implemented on the system 800 as illustrated in FIG. 8. For example, one or more operations in the process 400 may be stored in the storage device 801 of the server 810 as a form of instructions, and invoked and/or executed by the processor 802 of the server 810. In some embodiments, the instructions may be transmitted in a form of electronic current or electrical signals. For illustration purposes, the processor 802 may be described as a subject to perform the process 400. The method may include one or more following operations.

In 401, the processor 802 may assign an identification code to a nail printing pattern.

In 402, the processor 802 may label the nail printing pattern based on the identification code.

In 403, the processor 802 may store the qualified nail printing pattern with the identification code to the server if the nail printing pattern qualifies for the preset rule.

In 404, the processor 802 may display the qualified nail printing pattern and the price information of the qualified nail printing pattern on a sale website based on a predetermined strategy.

In 405, the processor 802 may receive a purchase request for the nail printing pattern sent by a second account via a second user terminal or a second nail printing device.

In 406, the processor 802 may confirm a purchase price according to the identification code of the nail printing pattern.

In 407, the processor 802 may send a payment code to the second user terminal or the second nail printing device based on the purchase price and the purchase request.

In 408, the processor 802 may receive payment information corresponding to the payment code from the second user terminal or the second nail printing device.

In 409, the processor 802 may determine usage permissions of the second account to the nail printing pattern based on the payment information.

In some embodiments, operations 401-404 may be performed in a similar manner with operations 303-306 of the process 300, and the descriptions thereof are not repeated herein. In operations 405-409, the user may login into the sale website (or the nail printing mall application) using the second account via the second user terminal and the second nail printing device, and browse nail printing patterns uploaded by other users (e.g., the designers). When the user decides to purchase a nail printing pattern, a purchase request may be generated by requesting the sale website or the nail printing mall application. The purchase request may include an identification code of the nail printing pattern. In some embodiments, the purchase request may be implemented by operating an operation interface of the second user terminal or the second nail printing device, which is not limited in the present disclosure. When receiving the purchase request from the second account, the processor 802 may analyze the identification code within the purchase request to determine a target nail printing pattern and price information of the target nail printing pattern. The processor 802 may determine the purchase price based on the price information of the target nail printing pattern. The processor 802 may generate a payment code or a payment link based on the purchase price. The processor 802 may send the payment code or the payment link to the second account via the second user terminal or the second nail printing device. The user corresponding to the second account may select a payment way based on the received payment code or the payment link. For example, the payment way may include payment by WeChat, payment by Alipay, payment by a credit card, or the like. The second user terminal or the second nail printing device on which the second account logins may send the payment information (e.g., the payment result) to the processor 802. The processor 802 may determine usage permissions of the second account to the target nail printing pattern based on the payment information. The usage permissions may include a usage permission of printing once, a usage permission of printing multiple times, or a usage permission without print limit within a predetermined time period, or the like, or any combination thereof.

Compared with the prior art, the process 400 disclosed in the embodiment of the present disclosure provides an approach of purchasing a nail printing pattern on the sale website, and provides multiple payment ways to satisfy various demands of different users. The process 400 may set different usage permissions for the nail printing patterns for the user to select and purchase, which satisfies different demands of the user and enhances the user experience. In the present disclosure, the user may only purchase the right to use the nail printing pattern and not the ownership of the nail printing pattern. That is, the user cannot download the nail printing pattern locally for secondary modification, permanent use or other purposes, which may effectively protect the intellectual property of the owner of the nail printing pattern.

Embodiment Five

Figure 5:
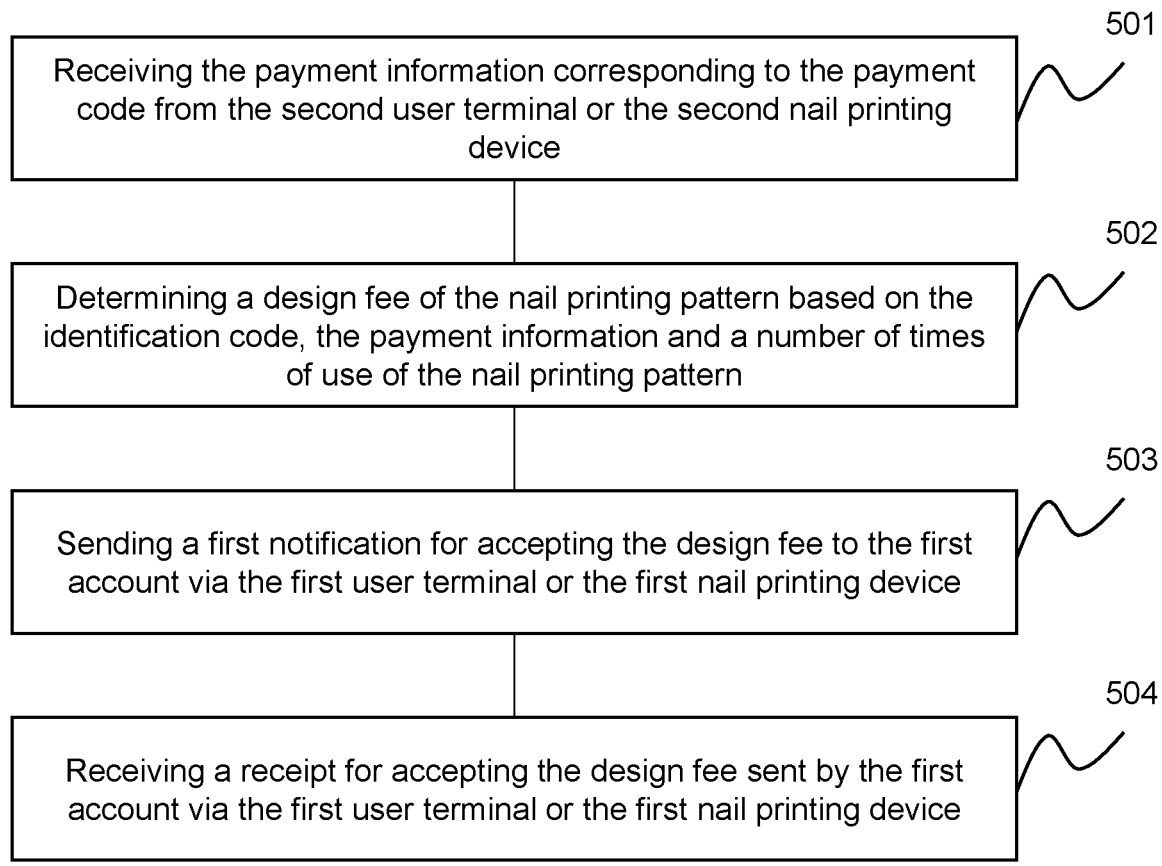
FIG. 5 is a flowchart illustrating an exemplary process for sharing nail printing patterns according to a fifth embodiment of the present disclosure.

FIG. 5 is a flowchart illustrating an exemplary process for sharing nail printing patterns according to a fifth embodiment of the present disclosure. The process 500 disclosed in the present embodiment may be implemented on a mobile device that can perform functions of nail printing pattern sharing. In some embodiments, the mobile device may include a mobile phone, a tablet, a laptop computer, a desktop, a server, or the like, or any combination thereof. In some embodiments, the process 500 disclosed in the present embodiment may be implemented on the system 800 as illustrated in FIG. 8. For example, one or more operations in the process 500 may be stored in the storage device 801 of the server 810 as a form of instructions, and invoked and/or executed by the processor 802 of the server 810. In some embodiments, the instructions may be transmitted in a form of electronic current or electrical signals. For illustration purposes, the processor 802 may be described as a subject to perform the process 500. The method may include one or more following operations.

In 501, the processor 802 may receive the payment information corresponding to the payment code from the second user terminal or the second nail printing device.

In 502, the processor 802 may determine a design fee of the nail printing pattern based on the identification code, the payment information and a number of times of use of the nail printing pattern.

In 503, the processor 802 may send a first notification for accepting the design fee to the first account via the first user terminal or the first nail printing device.

In 504, the processor 802 may receive a receipt for accepting the design fee sent by the first account via the first user terminal or the first nail printing device.

In some embodiments, operation 501 may be performed in a similar manner with operation 408 of the process 400, and the descriptions thereof are not repeated herein. In operations 502-504, the processor 802 may determine a selling price of the nail printing pattern corresponding to the identification code based on the payment information and the number of times of use of the nail printing pattern. For example, the processor 802 may determine the total selling price of all nail printing patterns of the user during a predetermined settlement period. The predetermined settlement period may be pay-per-view, daily settlement, monthly settlement, quarterly settlement, or the like. The processor 802 may then determine the design fee that the designer of the nail printing pattern(s) should receive based on the price information of the nail printing pattern(s). For example, a first account A uploads 4 nail printing patterns. During the predetermined settlement period, the selling price of the nail printing pattern 0001 may be 50 yuan, which may be purchased by a user (e.g., a nail printing pattern requester) once. The selling price of the nail printing pattern 0002 may be 120 yuan, which may be purchased by a user (e.g., a nail printing pattern requester) three times. The remaining two nail printing patterns may not be sold. If the price information is a commission (e.g., 50%) of a selling price, the processor 802 may determine the design fee corresponding to the identification code based on the identification code, the payment information and the number of times of use of the nail printing pattern. Specifically, the design fee may be (50+120)×50%=85 yuan. The processor 802 may send a first notification for accepting 85 yuan design fee to the first account A via the first user terminal or the first nail printing device. The user may receive the design fee from the first account based on the first notification. For example, the user may receive the design fee by WeChat red packet or WeChat transfer. The receipt for accepting the design fee may be sent to the processor 802 by the first account A via the first user terminal or the first nail printing device.

Compared with the prior art, the process 500 disclosed in the embodiment of the present disclosure provides an approach for determining the design fee, which may facilitate the designer who uploads the nail printing pattern(s) to know the sale states of the nail printing pattern(s) timely. Besides, the process 500 also provides an approach for accepting the design fee, which may facilitate the designer to timely receive the design fee and increase the enthusiasm of the designer for designing nail printing patterns, thus facilitating to generate multiple high quality nail printing patterns.

Embodiment Six

Figure 6A:
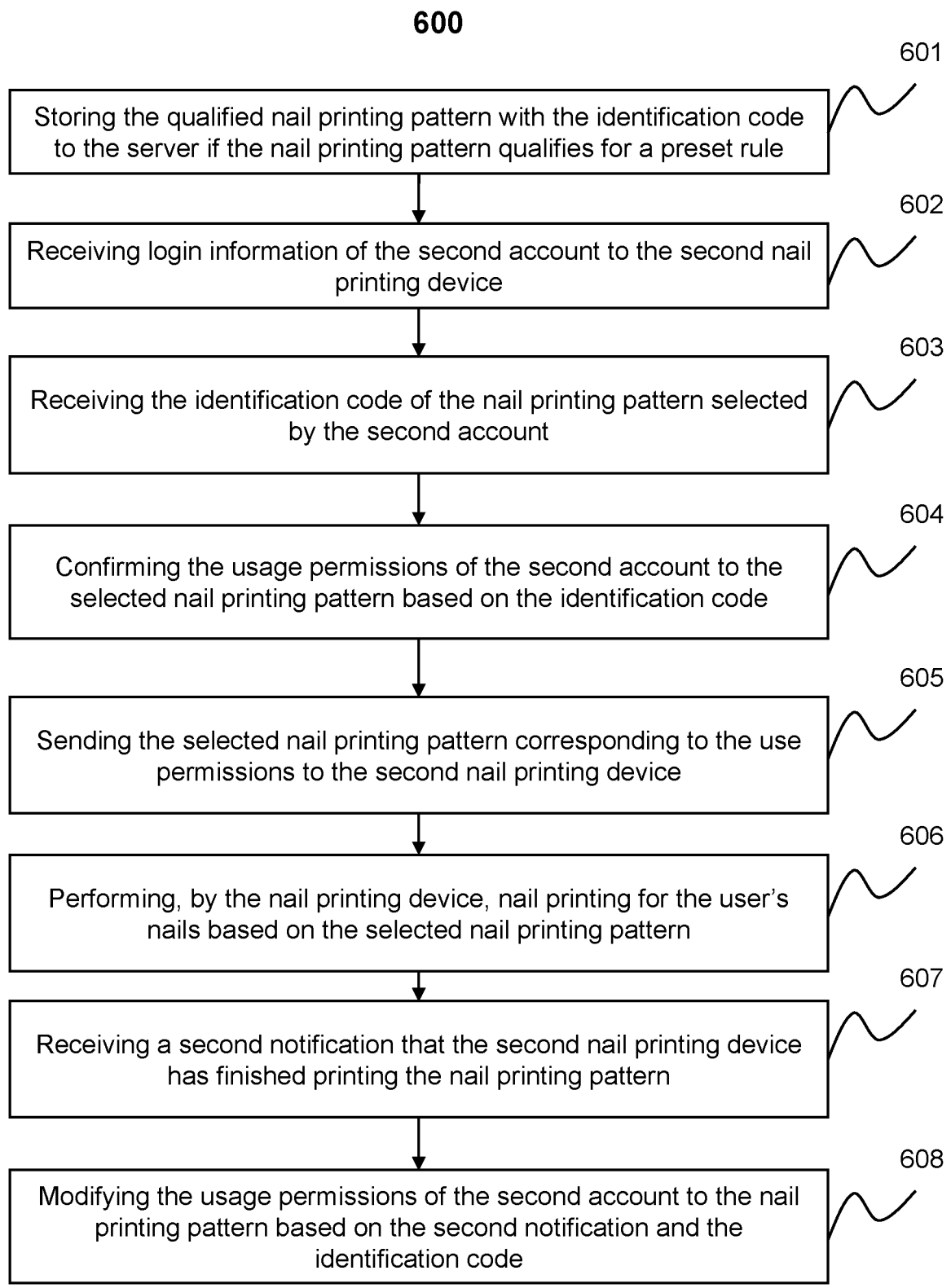
FIG. 6A is a flowchart illustrating an exemplary process for sharing nail printing patterns according to a sixth embodiment of the present disclosure.

FIG. 6 is a flowchart illustrating an exemplary process for sharing nail printing patterns according to a sixth embodiment of the present disclosure. The process 600 disclosed in the present embodiment may be implemented on a mobile device that can perform functions of nail printing pattern sharing. In some embodiments, the mobile device may include a mobile phone, a tablet, a laptop computer, a desktop, a server, or the like, or any combination thereof. In some embodiments, the process 600 disclosed in the present embodiment may be implemented on the system 800 as illustrated in FIG. 8. For example, one or more operations in the process 600 may be stored in the storage device 801 of the server 810 as a form of instructions, and invoked and/or executed by the processor 802 of the server 810. In some embodiments, the instructions may be transmitted in a form of electronic current or electrical signals. For illustration purposes, the processor 802 may be described as a subject to perform the process 600. The method may include one or more following operations.

In 601, the processor 802 may store the qualified nail printing pattern with the identification code to the server if the nail printing pattern qualifies for a preset rule.

In 602, the processor 802 may receive login information of the second account to the second nail printing device.

In 603, the processor 802 may receive the identification code of the nail printing pattern selected by the second account.

In 604, the processor 802 may confirm the usage permissions of the second account to the selected nail printing pattern based on the identification code.

In 605, the processor 802 may send the selected nail printing pattern corresponding to the user permissions to the second nail printing device.

In 606, the processor 802 may control the second nail printing device to perform nail printing on the user's nail based on the selected nail printing pattern.

In 607, the processor 802 may receive a second notification that the second nail printing device has finished printing the nail printing pattern.

In 608, the processor 802 may modify the usage permissions of the second account to the nail printing pattern based on the second notification and the identification code.

In some embodiments, operation 601 may be performed in a similar manner with operation 103 of the process 100, and the descriptions thereof are not repeated herein. In operations 602-603, the user (e.g., the nail printing pattern requester) may login into the sale website (or the nail printing mall application) using the second account before printing, and select the nail printing pattern for printing. The identification code of the nail printing pattern may be sent to the server when the nail printing pattern for printing is determined. Specifically, a display (e.g., a touch screen) of the second user terminal and the second nail printing device may be configured to display a human-computer interaction interface. The human-computer interaction interface may at least include an image selection interface and an image preview interface. The image selection interface may be configured to display thumbnails of one or more nail printing patterns. The nail printing patterns may include one or more different styles or types of images, e.g., cute, mature, professional, etc. The image selection interface may display thumbnails of one or more nail printing patterns of a type selected by the user. The user may select one of the nail printing patterns of the selected type by touching the thumbnail of the corresponding nail printing pattern. When the user touches the thumbnail of the nail printing pattern, a magnified view of the nail printing pattern may be displayed via the image preview interface, so that the user can confirm whether he/her satisfies with the selected nail printing pattern. The human-computer interaction interface may include an image adjustment menu below the image preview interface, which is configured to adjust the nail printing pattern. After the user selects and/or adjusts the nail printing pattern, the user may click a printing button to send the identification code of the selected nail printing pattern to the server (e.g., the processor 802 of the server 810).

In 604, the processor 802 may confirm whether the second account has the usage permissions for the selected nail printing pattern based on the identification code of the selected nail printing pattern and account information of the second account. If the second account does not have the usage permissions, the processor 802 may guide the user to purchase the user permissions according to the process 400 disclosed in the fourth embodiment of the present disclosure.

In 605, if the second account has the usage permissions for the selected nail printing pattern, the processor 802 may send the nail printing pattern corresponding to the usage permissions to the second nail printing device. The second nail printing device may perform nail printing according to the received nail printing pattern and one or more parameters. After finishing the nail printing every time, the second nail printing device may send the second notification to the server (e.g., the server 810), so that the processor 802 of the server 810 can modify the usage permissions of the second account based on the second notification. For example, the usage permissions of the second account may be 10 times/per month. If the second nail printing device finishes the nail printing once, the processor 802 may modify the usage permissions being 9 times/per month after receiving the second notification. Alternatively, if the nail printing fails, the processor 802 may not need to modify the usage permission.

Figure 6B:
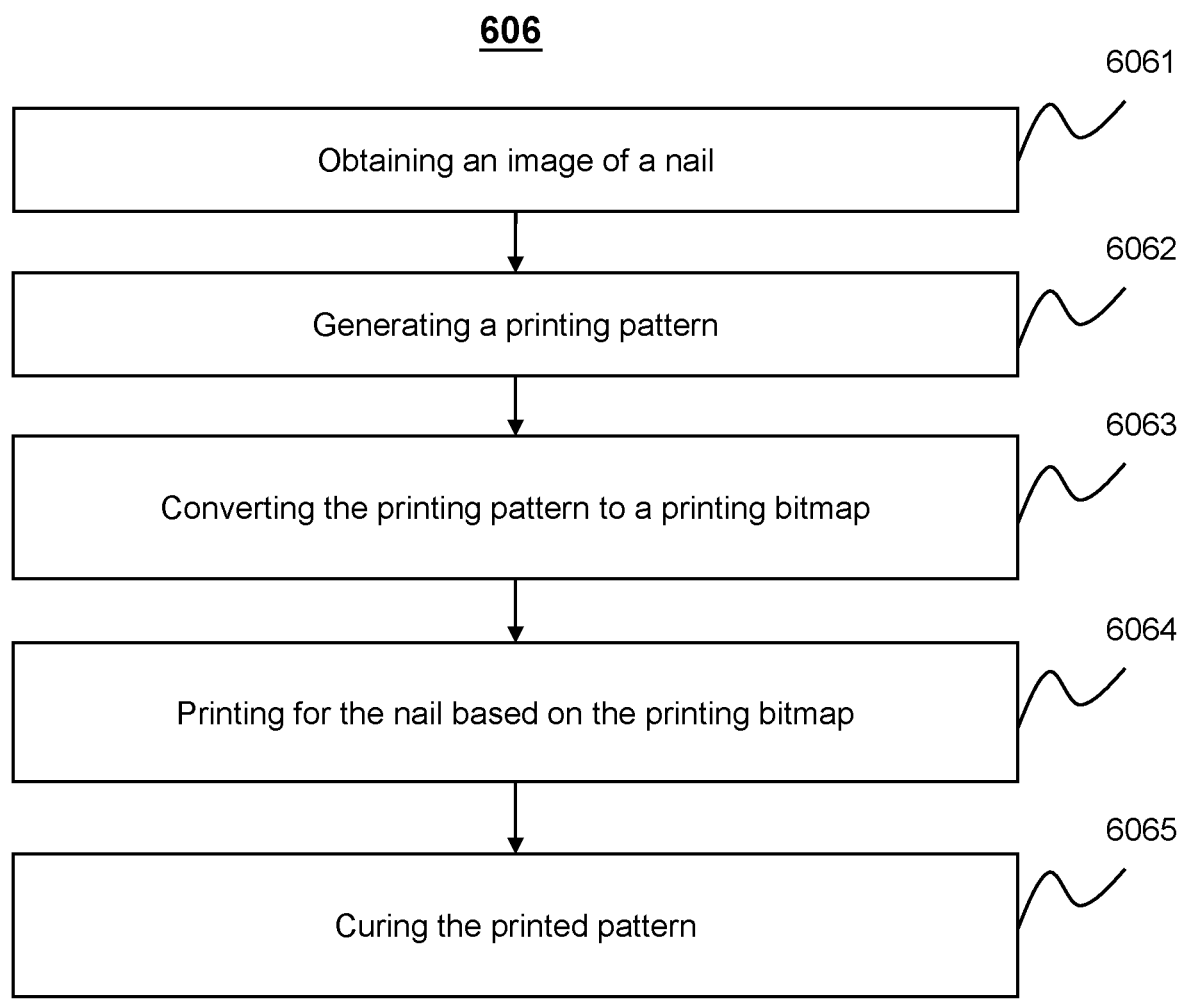
FIG. 6B is a flowchart illustrating an exemplary nail printing process according to an embodiment of the present disclosure.

In 606, the processor 802 may perform, by the second nail printing device, nail printing for the user's nails based on the selected nail printing pattern. The nail printing process of the second nail printing device may be shown in FIG. 6B. As shown in FIG. 6B, the nail printing process of the second nail printing device may include: obtaining an image of a nail (also referred to as a nail image) (operation 6061); generating a printing pattern (operation 6062); converting the printing pattern to a printing bitmap (operation 6063); printing for the nail based on the printing bitmap (operation 6064); and curing the printed pattern (operation 6065).

In some embodiments, the second nail printing device may include a processor, a micro control unit, a printing platform, a storage device, a robot arm, a first driving chip, a second driving chip, a first motor, a second motor, a nozzle control unit, a printing nozzle, a grating ruler, a grating sensor, a touch display, a speaker, a lighting device, an image capture device, a communication device, an accessory bin, a print bin door, a power module, a first limiting device and a second limiting device. The processor and the micro control unit may communicate with each other via a UART (Universal Asynchronous Receiver/Transmitter) or a SPI (Serial Peripheral Interface).

In 6061, the user may put a finger requiring nail printing into a finger fixed area of the printing platform. The image capture device may automatically capture a video or an image of the finger. The processor of the second nail printing device may display the video of the finger on the human-computer interaction interface. The processor of the second nail printing device may control the image capture device to capture an image of the finger based on the video. The processor may binary the image to extract a nail region and generate the nail image. The processor may display the nail image on the human-computer interaction interface. The processor of the second nail printing device may further identify a center position of the nail image and a curvature of the nail to adjust a printing trajectory. In some embodiments, the identifying the curvature of the nail may include: obtaining an image feature of the nail; inputting the image feature into a pre-trained nail curvature determination model to generate a nail curvature value corresponding to the image feature; outputting the nail curvature value. In some embodiments, the nail may be a finger nail, a toe nail, an artificial nail, or the like. The image feature may include an LBP (Local Binary Pattern) feature, an HOG (Histogram of Oriented Gradient) feature, an SURF (Speeded Up Robust Features) feature, an SIFT (Scale-Invariant Feature Transform) feature, or the like, or any combination thereof. The LBP feature may be a partial texture feature of the nail image extracted by an LBP operator. The HOG feature may be a histogram feature formed by a gradient direction histogram of a local region of the nail image calculated by an HOG operator. The SIFT feature may be a scale-invariant feature of the nail image extracted by the an SIFT operator. The SURF feature may be a scale-invariant feature of the nail image extracted by a SURF operator modified on the SIFT operator. The pre-trained nail curvature determination model may include a KNN (k-Nearest Neighbor) model, an SVM (Support Vector Machine) model, a Random Forests model, an Adaboost model, or the like, or any combination thereof. The pre-training of the nail curvature determination model may be performed using a plurality of training samples including image features and corresponding nail curvature values. The image feature of each of the training samples may be marked with a tag. The tag may include but is not limited to a nail curvature value. The image feature with tag of each training sample may be inputted into the nail curvature determination model. The nail curvature values in the tags of the training samples may be determined as the output of the nail curvature determination model. The pre-training of the nail curvature determination model may be performed by adjusting parameters of the nail curvature determination model using the plurality of training samples. The trained nail curvature determination model may automatically generate or predict the nail curvature value based on the image feature of the nail image, so that the second nail printing device can adjust a printing strategy based on the nail curvature value.

In 6062, the processor of the second nail printing device may display an outline of the nail image on the image preview interface based on center position of the nail image. The user may adjust an overlap position of the nail printing pattern in a nail image region. The processor of the second nail printing device may then process the selected nail printing pattern and the nail image. The processor may generate the printing pattern with the outline of the nail image and the nail printing pattern.

In 6063, the processor of the second nail printing device may convert the printing pattern into a printing bitmap with a plurality of pixels. The processor may determine a size parameter, a coordinate parameter and a color parameter of each pixel based on the printing bitmap. In some embodiments, the printing bitmap may include a plurality of pixels arranged in a matrix. The processor of the second nail printing device may generate a printing moving signal based on the size parameter and the coordinate parameter. The micro control unit of the second nail printing device may provide a drive signal of the first motor and the second motor based on the printing moving signal to drive the printing platform to move.

In 6064, the user may select a printing button when the printing pattern is determined. The second nail printing device may start the printing process. Specifically, the processor may control an inkjet head to clean the residual ink on the printing nozzle. The micro control unit may perform a moving test for the printing platform to test whether a moving speed of the printing platform along a first direction is stable. If the moving speed of the printing platform is not stable, the positions with unstable moving speed may be compensated when the drive signal of the first motor is adjusted, to ensure a stable moving speed of the printing platform within a printing region. After the actual printing process starts, the processor of the second nail printing device may move the printing platform to an X reset point based on a limit signal provided by a limiting device. The micro control unit of the second nail printing device may accelerate the printing platform to move from the X reset point along the first direction to a first side printing edge position according to the printing moving signal. The micro control unit may control the printing platform to move from the first side printing edge position to a second side printing edge position with the stable speed. Finally, the micro control unit may slow down the printing platform from the second side printing edge position to a linefeed position of a first line (which is determined by the size parameter). The micro control unit of the second nail printing device may determine whether the printing platform reaches the linefeed position based on grating signal count. If the printing platform reaches the linefeed position, the micro control unit of the second nail printing device may generate a linefeed signal. The second motor may drive the printing platform to wrap the line spacing in the second direction according to the linefeed signal. After the linefeed is succeeded, the micro control unit may accelerate the printing platform to move backward from the first direction to the second side printing edge position. The micro unit may control the printing platform to move from the second side printing edge position to the first side printing edge position with the stable speed. Finally, the micro control unit may slow down the printing platform from the first side printing edge position to a linefeed position of a second line. The micro control unit may determine whether the printing platform reaches the linefeed position of the second line based on grating signal count. If the printing platform reaches the linefeed position of the second line, the micro control unit may generate a second linefeed signal. The second motor may drive the printing platform to wrap the line spacing in the second direction according to the second linefeed signal. In some embodiments, the movement processes of the third line and subsequent odd lines may be performed in a similar manner with the movement process of the first line, and the descriptions thereof are not repeated herein. In some embodiments, the movement processes of the fourth line and subsequent even lines may be performed in a similar manner with the movement process of the first line, and the descriptions thereof are not repeated herein.

When the printing platform moves from the first side printing edge position to the second side printing edge position or from the second side printing edge position to the first side printing edge position, the processor of the second nail printing device may control the printing nozzle to perform ink ejection, and perform nail printing on the user's nail. Specifically, when the printing platform moves with a stable movement at each line, the processor of the second nail printing device may count the linefeed signal to obtain the current position of the platform in the second direction (e.g., Y coordinate). The processor may obtain the current position of the printing platform in the first direction (e.g., X coordinate) by adding or subtracting the grating signal. The processor may determine a current printing pixel based on the current position (X, Y coordinates) of the printing platform and coordinate parameter of each pixel in the printing bitmap. The processor may generate an inkjet signal based on the color parameter of the current printing pixel. The processor may control an inkjet color and an inkjet time for one or more pixel positions corresponding to each line during printing based on the inkjet signal. The processor may control the touch display to display the print progress in real-time based on a current printing position determined based on the one or more current printing pixels.

In 6065, after printing the printing pattern, the processor of the second nail printing device may control the lighting device to emit ultraviolet light to cure the printed pattern on the user's nail. After the curing, the lighting device may send a curing completion command to the processor of the second nail printing device. After covering a sealant, the processor of the second nail printing device may control the lighting device to emit ultraviolet light to cure the sealant on the nail.

Compared with the prior art, the process 600 disclosed in the embodiment of the present disclosure provides an approach for printing the nail printing pattern. The usage permissions for the nail printing patterns may be managed by the server (e.g., the processor 802 of the server 810). If the user has usage permissions for a nail printing pattern, the user may easily operate the second nail printing device to perform nail printing based on the selected nail printing pattern. Each time the user consumes, the processor 802 may provide detailed consumption list and the usage permissions for nail printing patterns, which may facilitate the management of nail printing patterns and the consumption habits of the user.

Embodiment Seven

Figure 7:
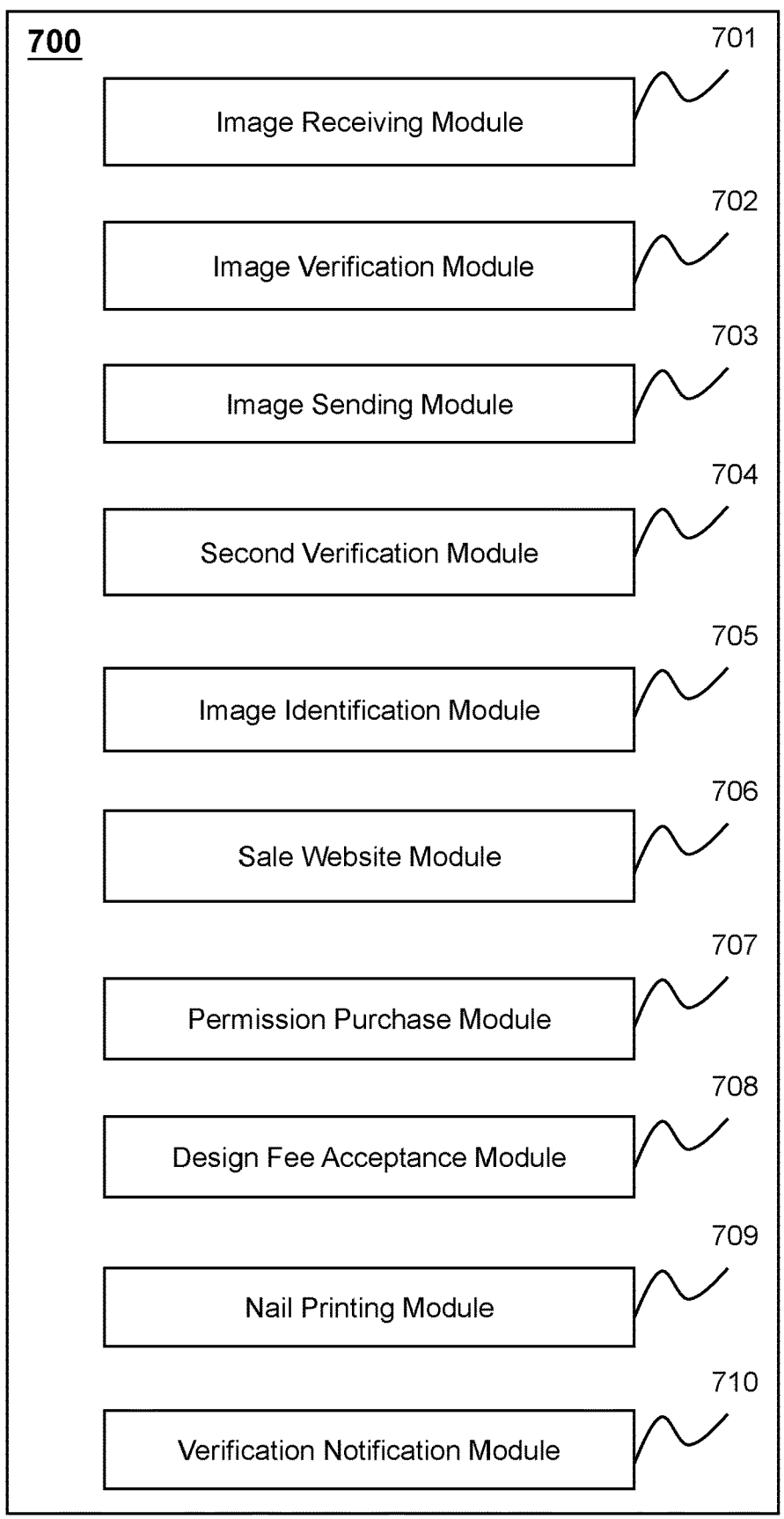
FIG. 7 is a schematic diagram illustrating an exemplary device for sharing nail printing patterns according to a seventh embodiment of the present disclosure.

FIG. 7 is a schematic diagram illustrating an exemplary device for sharing nail printing patterns according to a seventh embodiment of the present disclosure. The device 700 (also referred to as nail printing pattern sharing device 700) may be implemented by software and/or hardware. The device 700 may be implemented on a terminal (e.g., a mobile device). The device 700 may achieve the sharing and selling of nail printing patterns designed by users via the process of sharing nail printing patterns (e.g., processes 100-600), which may facilitate to store multiple nail printing patterns and improve the usage functions of a nail printing device.

The device 700 may include an image receive module 701, an image verification module 702 and an image sending module 703.

The image receive module 701 may be configured to receive a nail printing pattern and price information of the nail printing pattern uploaded by a first account via a first user terminal or a first nail printing device.

The image verification module 702 may be configured to verify the nail printing pattern and the price information of the nail printing pattern based on a preset rule. In some embodiments, the image verification module 702 may verify whether content of the nail printing pattern satisfies a predetermined security level, verify whether a format of the nail printing pattern satisfies a predetermined image quality requirement, verify whether the price information of the nail printing pattern satisfies a predetermined price range.

The image sending module 703 may be configured to store qualified nail printing pattern to a server if the nail printing pattern qualifies for the preset rule.

The device 700 may further include a second verification module 704. The second verification module 704 may be configured to send unqualified nail printing pattern back to the first user terminal or the first nail printing device if the nail printing pattern does not qualify for the preset rule. The image receive module 701 may further receive a modified nail printing pattern uploaded by the first account via the first user terminal or the first nail printing device. The image verification module 703 may further verify the modified nail printing pattern based on the preset rule The device 700 may further include an image identification module 705. The image identification module 705 may be configured to assign an identification code to the nail printing pattern and identify or label the nail printing pattern based on the identification code. The image sending module 703 may store the qualified nail printing pattern with the identification code to the server.

The device 700 may further include a sale website module 706. The sale website module 706 may be configured to display the qualified nail printing pattern and the price information of the qualified nail printing pattern on a sale website based on a predetermined strategy.

The device 700 may further include a permission purchase module 707. The permission purchase module 707 may be configured to receive a purchase request for the nail printing pattern sent by a second account via a second user terminal or a second nail printing device. The permission purchase module 707 may then confirm a purchase price according to the identification code of the nail printing pattern. The permission purchase module 707 may send a payment code to the second user terminal or the second nail printing device based on the purchase price and the purchase request. The permission purchase module 707 may receive payment information corresponding to the payment code from the second user terminal or the second nail printing device. The permission purchase module 707 may determine usage permissions of the second account to the nail printing pattern based on the payment information.

The device 700 may further include a design fee acceptance module 708. The design fee acceptance module 708 may be configured to determine a design fee of the nail printing pattern based on the identification code, the payment information and a number of times of use of the nail printing pattern. The design fee acceptance module 708 may send a first notification for accepting the design fee to the first account via the first user terminal or the first nail printing device. The design fee acceptance module 708 may receive a receipt for accepting the design fee sent by the first account via the first user terminal or the first nail printing device.

The device 700 may further include a nail printing module 709. The nail printing module 709 may be configured to receive login information of the second account to the second nail printing device. The nail printing module 709 may receive the identification code of the nail printing pattern selected by the second account. The nail printing module 709 may confirm the usage permissions of the second account to the selected nail printing pattern based on the identification code. The nail printing module 709 may send the nail printing pattern corresponding to the usage permissions to the second nail printing device. The nail printing module 709 may receive a second notification that the second nail printing device has finished printing the nail printing pattern. The nail printing module 709 may modify the usage permissions of the second account to the nail printing pattern based on the second notification and the identification code.

It should be noted that the above-mentioned first user terminal and the second user terminal, or the first nail printing device and the second nail printing device are merely for illustration purposes, and are not intended to limit the scope of the present disclosure. The first user terminal and the second user terminal may have same functions. The first nail printing device and the second nail printing device may have same functions. The first account and the second account are also provided for illustration purposes. Functions of the first account and the second account may be achieved by a same account.

The device 700 may further include a verification notification module 710. The verification notification module 710 may send a qualifying notification to the first account of the first user terminal or the first nail printing device. The qualifying notification may include a thumbnail of the nail printing pattern, the price information of the nail printing pattern, a qualification result, or the like, or any combination thereof.

Compared with the prior art, the device 700 disclosed in the embodiment of the present disclosure may be used to perform one or more operations of the process for sharing nail printing patterns (e.g., the processes 100-600). The implementation principle and technical effects of the device 600 may be similar to the processes 100-600, which can refer to the descriptions in FIGS. 1-6 and is not repeated herein.

Embodiment Eight

FIG. 8 is a schematic diagram illustrating an exemplary system for sharing nail printing patterns according to an eighth embodiment of the present disclosure. As shown in FIG. 8, the system 800 (also referred to as a nail printing pattern sharing system) may include a server 810, a user terminal 820 and a nail printing device 830. The user terminal 820 may be the first user terminal or the second user terminal. The nail printing device 803 may be the first nail printing device or the second nail printing device. The server 810 may establish a first communication connection with the user terminal 820 or the nail printing device 830 for receiving a nail printing pattern edited by the user terminal 820 or the nail printing device 830. The server 810 may establish a second communication connection with the nail printing device 830 for providing the nail printing pattern to the nail printing device 830 for performing printing. The server 810 may at least include a storage device 801 and a processor 802. It should be noted that the server 810 may include more than one processor 802. In FIG. 8, the storage device 801 and processor 802 in the server 810 may be connected via a bus. It should be noted that the storage device 801 and the processor 802 may be connected via other ways.

The storage device 801 may be a computer-readable medium configured to store software programs, computer executable programs, instructions and modules (e.g., the image receiving module 701, the image verification module 702 and the image sending module 703 of the device 700). The processor 802 may run the software programs, the instructions, and the modules stored in the storage device 801 to perform various function applications and data processing of the device (the nail printing device 830)/terminal (the user terminal 820)/server (the server 810) to implement the process of sharing nail printing pattern (e.g., the processes 100-600).

The storage device 801 may include a program storage area and a data storage area. The program storage area may store operation systems, application programs required by at least one function. The data storage area may store data generated during the process of sharing nail printing pattern, etc. In addition, the storage device 801 may include a high-speed random access memory, a non-volatile storage device, (e.g., a disk storage device, a flash memory, or other non-volatile solid-state storage device), or the like. In some embodiments, the storage device 801 may include a remote storage device relative to the processor 802. The remote storage device may be connected to the device (the nail printing device 830)/terminal (the user terminal 820)/server (the server 810) via a network. The network may include but not limited to Internet, intranets, local area networks, mobile communication networks, or the like, or any combinations thereof.

The storage media may include any of various types of storage devices. The term "storage media" may include an install medium, e.g., CD-ROM, floppy, or tape device; a computer system storage device or random access memory such as DRAM, DDRRAM, SRAM, EDORAM, Rambus RAM, etc.; a non-volatile storage device, such as flash memory, magnetic medium (e.g., hard disk or light storage device); a register or other similar types of storage device components. The storage media may further include other types of storage devices or any combination thereof. Alternatively, the storage media may be located in the first computer system in which the programs are executed, or may be in a second computer system different from the first computer system. The second computer system may be connected to the first computing system via a network (such as the Internet). The second computer system may provide program instructions to the first computer system to execute. The term "storage media" may include two or more storage media that reside in different locations (e.g., in different computer systems connected via network). The storage media may store program instructions executed by one or more processor execute (e.g., computer programs).

The present disclosure may also provide a storage medium including computer executable instructions. The computer executable instructions may execute the process for sharing nail printing pattern disclosed in the present disclosure (e.g., processes 100-600).

In some embodiments, the present disclosure may provide a computer-readable storage medium storing computer instructions. The computer instructions may be executed by a processor to implement a method for sharing a nail printing pattern.

The method may include receiving the nail printing pattern and price information of the nail printing pattern uploaded by a first account via a first user terminal or a first nail printing device; verifying the nail printing pattern and the price information of the nail printing pattern based on a preset rule; and if the nail printing pattern qualifies for the preset rule, storing qualified nail printing pattern to a server.

It should be noted that the computer-readable storage medium storing computer instructions is not limited to execute the above process, and may execute the processes for sharing nail printing pattern disclosed in the present disclosure (e.g., processes 100-600).

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 1703, Perl, COBOL 1702, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a software as a service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. A method for sharing a nail printing pattern implemented on a server that at least includes a storage, a processor, and computer programs stored in the storage, comprising:
   establishing a first communication connection between the server with a first user terminal or a first nail printing device, the first user terminal or the first nail printing device including a human-computer interaction interface configured to display a plurality of nail printing patterns and price information of the plurality of nail printing patterns;
   directing the human-computer interaction interface to display the plurality of nail printing patterns and price information of the plurality of nail printing patterns through the first communication connection;
   receiving, through the first communication connection, a nail printing pattern and price information of the nail printing pattern selected by the user from the plurality of nail printing patterns and uploaded by a first account from the first user terminal or the first nail printing device via the human-computer interaction interface;
   verifying, through the server, the nail printing pattern and the price information of the nail printing pattern based on a preset rule; and
   in response to the nail printing pattern qualifying for the preset rule, storing the qualified nail printing pattern to the server.

2. The method of claim 1, wherein after the verifying the nail printing pattern and the price information of the nail printing pattern based on the preset rule, the method further comprises:
   if the nail printing pattern does not qualify for the preset rule, sending the unqualified nail printing pattern back to the first user terminal or the first nail printing device;
   receiving a modified nail printing pattern uploaded by the first account via the first user terminal or the first nail printing device; and
   verifying the modified nail printing pattern based on the preset rule.

3. The method of claim 1, wherein after the receiving the nail printing pattern and the price information of the nail printing pattern uploaded by the first account via the first user terminal or the first nail printing device, the method further comprises:
   assigning an identification code to the nail printing pattern; and
   labelling the nail printing pattern based on the identification code; and
   the storing the qualified nail printing pattern to a server comprises:
   storing the qualified nail printing pattern with the identification code to the server.

4. The method of claim 3, wherein after the storing the qualified nail printing pattern with the identification code to the server, the method comprises:
   displaying the qualified nail printing pattern and the price information of the qualified nail printing pattern on a sale website based on a predetermined strategy.

5. The method of claim 4, wherein after the displaying the qualified nail printing pattern and the price information of the qualified nail printing pattern on the sale website based on the predetermined strategy, the method comprises:
   receiving a purchase request for the nail printing pattern sent by a second account via a second user terminal or a second nail printing device;
   confirming a purchase price according to the identification code of the nail printing pattern;
   sending a payment code to the second user terminal or the second nail printing device based on the purchase price and the purchase request;
   receiving payment information corresponding to the payment code from the second user terminal or the second nail printing device; and determining usage permissions of the second account to the nail printing pattern based on the payment information.

6. The method of claim 5, wherein after the receiving the payment information corresponding to the payment code from the second user terminal or the second nail printing device, the method comprises:

determining a design fee of the nail printing pattern uploaded by the first account based on the identification code, the payment information and a number of times of use of the nail printing pattern;

sending a first notification for accepting the design fee to the first account via the first user terminal or the first nail printing device; and receiving a receipt for accepting the design fee sent by the first account via the first user terminal or the first nail printing device.

7. The method of claim 5, wherein after the determining usage permissions of the second account to the nail printing pattern based on the payment information, the method comprises:

receiving login information of the second account to the second nail printing device;

receiving the identification code of the nail printing pattern selected by the second account;

confirming the usage permissions of the second account to the selected nail printing pattern based on the identification code;

sending the nail printing pattern corresponding to the usage permissions to the second nail printing device;

receiving a second notification that the second nail printing device has finished printing the nail printing pattern; and modifying the usage permissions of the second account to the nail printing pattern based on the second notification and the identification code.

8. The method of claim 1, wherein the verifying the nail printing pattern and the price information of the nail printing pattern based on a preset rule comprises:

verifying whether content of the nail printing pattern satisfies a predetermined security level; or verifying whether a format of the nail printing pattern satisfies a predetermined image quality requirement; or verifying whether the price information of the nail printing pattern satisfies a predetermined price range.

9. The method of claim 1, wherein after the storing the qualified nail printing pattern to the server, the method comprises:

sending a qualifying notification of the nail printing pattern to the first account of the first user terminal or the first nail printing device.

10. The method of claim 9, wherein the qualifying notification includes at least one of a thumbnail of the nail printing pattern, the price information of the nail printing pattern, or a qualification result of the nail printing pattern.

11. A device for sharing a nail printing pattern, comprising: an image receiving module configured to establish a first communication connection between the device with a user terminal or a nail printing device, the user terminal or the nail printing device including a human-computer interaction interface configured to display a plurality of nail printing patterns and price information of the plurality of nail printing patterns;

direct the human-computer interaction interface to display the plurality of nail printing patterns and price information of the plurality of nail printing patterns through the first communication connection; and receive a nail printing pattern and price information of the nail printing pattern selected by the user from the plurality of nail printing patterns and uploaded by a first account from the user terminal or the nail printing device via the human-computer interaction interface;

an image verification module configured to verify the nail printing pattern and the price information of the nail printing pattern based on a preset rule; and an image sending module configured to, in response to the nail printing pattern qualifying for the preset rule, send the qualified nail printing pattern to the device.

* * * * *